United States Patent [19]

Drawert et al.

[11] 4,397,991

[45] Aug. 9, 1983

[54] POLYESTERAMIDE ADHESIVES AND SEALING COMPOUNDS

[75] Inventors: Manfred Drawert, Froendenberg; Wolfgang Imoehl, Unna, both of Fed. Rep. of Germany

[73] Assignee: Schering Aktiengesellschaft, Berlin and Bergkamen, Fed. Rep. of Germany

[21] Appl. No.: 364,241

[22] Filed: Apr. 1, 1982

[30] Foreign Application Priority Data

Apr. 24, 1981 [DE] Fed. Rep. of Germany ....... 3116349

[51] Int. Cl.$^3$ .............................................. C08L 67/02
[52] U.S. Cl. .................................. 525/167; 260/404.5; 528/291; 528/295.3; 528/295.5
[58] Field of Search ............ 525/167; 528/291, 295.3, 528/295.5; 260/404.5 PA

[56] References Cited

U.S. PATENT DOCUMENTS

| | | | |
|---|---|---|---|
| Re. 28,533 | 8/1975 | Drawert et al. | 528/295.3 |
| 2,653,880 | 9/1953 | Hendricks | 117/68.5 |
| 3,037,871 | 6/1962 | Floyd et al. | 260/404.5 PA |
| 3,397,816 | 8/1968 | Ess et al. | 220/81 |
| 3,582,507 | 6/1971 | Peerman | 260/23 |
| 3,781,234 | 12/1973 | Drawert et al. | 260/404.5 PA |
| 4,218,351 | 8/1980 | Rasmussen | 260/404.5 PA |

FOREIGN PATENT DOCUMENTS

| | | |
|---|---|---|
| 1520002 | 7/1975 | Fed. Rep. of Germany . |
| 571017 | 8/1945 | United Kingdom . |
| 1055610 | 1/1967 | United Kingdom . |
| 1055676 | 1/1967 | United Kingdom . |
| 1076030 | 7/1967 | United Kingdom . |
| 1138142 | 12/1968 | United Kingdom . |
| 1226112 | 3/1971 | United Kingdom . |
| 1227858 | 4/1971 | United Kingdom . |

*Primary Examiner*—Lucille M. Phynes
*Attorney, Agent, or Firm*—Curtis, Morris & Safford

[57] ABSTRACT

What are disclosed are polyesteramides prepared by the condensation of dimerized fatty acids having 16–44 carbon atoms with ethylene diamine and with aliphatic co-diamines which are optionally substituted and optionally interrupted by heteroatoms, with diglycolamine, and with aliphatic, cycloaliphatic, aromatic, or araliphatic co-dicarboxylic acids; mixtures of such polyesteramides with copolymers of ethylene and vinyl acetate; and methods for using these polyesteramides or mixtures for the adhesion of organic or inorganic substrates to themselves or to each other, or as sealing compounds.

6 Claims, No Drawings

POLYESTERAMIDE ADHESIVES AND SEALING COMPOUNDS

The present invention relates to polyesteramides prepared by the condensation of dimerized fatty acids with ethylene diamine and aliphatic co-diamines, with diglycolamine, and with optional co-dicarboxylic acids; to mixtures of such polyesteramides with copolymers of ethylene and vinyl acetate; and to the use of such polyesteramides and mixtures for the adhesion of organic and inorganic substrates and as sealing compounds.

Polyamide resins which are prepared by the polycondensation of dimerized fatty acids with polyamines have been used for a long time as melt adhesives for the adhesion of inorganic and organic substrates, as have polyesteramides which are prepared by additionally using components containing hydroxyl groups.

However, these products still do not meet increased practical demands in many fields of use.

German Auslegeschrift No. 1,520,002 teaches polyesteramides formed from dimerized fatty acids of an exactly defined composition, from a dicarboxylic acid, a diamine, and from an alkanolamine of the general formula $H_2N-R'''-OH$, in which $R'''$ is an aliphatic hydrocarbon. These products are said to combine good impact resistance with an increased resistance to peeling on metals.

To be sure, these products show quite good flexibility at room temperature, but this flexibility is not fully satisfactory for certain uses, especially at lower temperatures of about 0° C. or less.

Further, these products do not show any compatibility with ethylene-vinyl acetate copolymers (EVA).

In order to answer the manifold demands made by the users of melt adhesives, it is necessary in many cases to mix the pure polyamide resin or polyesteramide resin with other thermoplastic components.

Particularly, a mixture of the resin with ethylene-vinyl acetate copolymers is often desired for the preparation of melt adhesives having special properties. A basic prerequisite for such formulations is that the substances which are to be mixed be compatible and also not show any demixing phenomenon when the melt is cooled.

The polyamide and polyesteramide resins heretofore known generally exhibit poor compatibility with ethylene-vinyl acetate copolymers. Only EVA copolymers having a very high vinyl acetate content of 35–40 percent can be admixed in small amounts with these polyamide resins.

On the other hand, if the commercially available polyesteramide resins heretofore described are mixed with EVA types which have a lower vinyl acetate content, it must be determined whether inhomogeneities arise, particularly in the solidified melt. These inhomogeneities can be most readily recognized by breaking a film, 3–5 mm thick, of the mixture. If there is an incompatibility of the resin with EVA, heavy milky opacifications appear at the break point.

The object of the present invention is to overcome the aforementioned disadvantages of the state of the art.

This object has been achieved according to the present invention by the discovery of polyesteramides which can be prepared by the condensation of:
(A) at least one dimerized fatty acid having 16–44 carbon atoms with
(B) ethylene diamine, and with
(C) at least one diamine of the formula $$H_2N-R-NH_2,$$

wherein R is an aliphatic, optionally substituted, hydrocarbon having 3–36 carbon atoms, which can be interrupted by hetero atoms, and with
(D) diglycolamine, and optionally with
(E) at least one dicarboxylic acid of the formula $$R^2OOC-R^1-COOR^2,$$

wherein $R^1$ is an aliphatic, cycloaliphatic, aromatic, or araliphatic hydrocarbon having 4–12 carbon atoms and $R^2$ is hydrogen or alkyl having 1 to 8 carbon atoms.

In these polyesteramides, the ratio of total acid equivalents present in components (A) and (E) to total amine and hydroxyl equivalents present in components (B), (C), and (D) is substantially 1:1.

The polyesteramides according to the invention can contain conventional additives and fillers, e.g. inorganic fillers, pigments and dyes, anti-oxidants, UV-absorbers, optical brighteners, antistatic agents, flame-proofing agents, and plasticizers, according to need.

A further feature of the invention is the use of the polyesteramides according to the invention as sealing compounds or for the adhesion of an organic or inorganic substance with itself or with some other organic or inorganic substance.

A further feature of the invention are mixtures of the polyesteramides according to the invention with EVA copolymers, as well as the use of these mixtures for the adhesion of an organic or inorganic substrate to itself or to some other organic or inorganic substrate, and as sealing compounds.

The dimerized fatty acids to be used according to the invention have dimer contents between 55 and 100 percent, preferably between 70 and 96 percent.

The term "dimerized fatty acids" refers in general to polymerized acids which are obtained from "fatty acids". The term "fatty acids" includes unsaturated natural and synthetic monobasic aliphatic acids having 8–22 carbon atoms, preferably 18 carbon atoms. These fatty acids can be polymerized according to known methods (cf. German Offenlegungsschriften Nos. 1,443,938 and 1,443,968 and German Pat. Nos. 2,118,702 and 1,280,852).

Typical polymeric fatty acids which are commercially available have the following approximate compositions:

| monomeric acids | 5–15 percent by weight |
| dimeric acids | 55–80 percent by weight |
| trimeric acids | 10–35 percent by weight |

The content of dimerized acids can be raised up to 100 percent by weight by generally known distillation methods.

The dimerized fatty acids employed can also be present in hydrogenated form.

When using distilled dimerized fatty acids, melt adhesives having an improved color number are obtained. On the other hand, the use of commercially available technical grade polymerized fatty acids is possible for the preparation of melt adhesives for certain uses. When technical grade dimerized fatty acids are used, notice need only be paid that the content of trimeric fatty acid does not exceed a maximum limit. This maximum value depends on the content of dimeric and monomeric fatty acids present in a given polymerized fatty acid and can be determined using an orientation test which is well within the daily manipulative routine of the average man skilled in the art.

However, distilled dimerized fatty acid having a content of dimeric fatty acid of from 70 to 96 percent is preferably used.

The content of monocarboxylic acids which may already be present in the dimerized fatty acid can be increased by the addition of further monocarboxylic acid in order to achieve a desired molecular weight in the polyesteramide product. As monocarboxylic acids which can be used according to the present invention, linear or branched, saturated or unsaturated, monocarboxylic acids having 2-22 carbon atoms particularly come under consideration, such as acetic acid, propionic acid, butyric acid, valerianic acid, lauric acid, palmitic acid, palmitoleinic acid, and erucic acid. The $C_{18}$-monocarboxylic acids such as stearic, oleic, linoleic acid, linolenic acid, and the naturally-occurring fatty acid mixtures such as tall oil fatty acid or soya oil fatty acid are preferred according to the invention.

As co-diamines which can be used according to the invention, those diamines come under consideration which have the formula $$H_2N-R-NH_2,$$

in which R is an aliphatic hydrocarbon having 3-36 carbon atoms, which optionally can be interrupted by one or more, generally one to four, hetero atoms such as, particularly, oxygen. Diamines in which R has from 6 to 20 carbon atoms, and in which R has 36 carbon atoms, are commercially available and are preferred diamines. Exemplary of such compounds are 1,6-diaminohexane; 1,9-diaminononane; 1,12-diaminododecane; 1,13-diaminotridecane; dimeric fatty acid diamine (prepared by known methods from dimeric fatty acids); 1,7-diamino-4-oxa-heptane; 1,7-diamino-3,5-dioxa-heptane; 1,10-diamino-4,7-dioxa-decane; 1,10-diamino-4,7-dioxa-5-methyl-decane; 1,11-diamino-6-oxa-undecane; 1,11-diamino-4,8-dioxa-undecane; 1,11-diamino-4,8-dioxa-5-methyl-undecane; 1,11-diamino-4,8-dioxa-5,6-dimethyl-7-propionyl-undecane; 1,12-diamino-4,9-dioxa-dodecane; 1,13-diamino-4,10-dioxa-tridecane; 1,13-diamino-4,7,10-trioxa-5,8-dimethyl-tridecane; 1,14-diamino-4,11-dioxa-tetradecane; 1,14-diamino-4,7,10-trioxa-tetradecane; 1,16-diamino-4,7,10,13-tetraoxa-hexadecane; and 1,20-diamino-4,17-dioxa-eicosane.

The equivalence ratio of ethylene diamine to the co-diamine in the total amine component can be between 0.05:0.25 and 0.25:0.05 at a diglycolamine content of 0.7 equivalent and can be between 0.1:0.8 and 0.8:0.1 at a diglycolamine content of 0.1 equivalent. At diglycolamine contents between 0.1 and 0.7 equivalent, the equivalence ratios of ethylene diamine to co-diamine can be at values intermediate to those disclosed above.

Diglycolamine is added according to the invention as an alkanolamine in addition to the diamine component. The ratio of the amine to diglycolamine is essentially determined by the degree of flexibility desired—at low temperatures as well as at high temperatures—, but also by the adhesion desired for the material to a given substrate. Further, the kind and nature of the acids also present influence the ratio.

The equivalence ratio of the diamine components [components (B) and (C)] to the diglycolamine [component (D)] in the total amine component can be chosen in the region from 0.3:0.7 to 0.9:0.1. Preferably, the equivalence ratio is in the region from 0.5:0.5 to 0.8:0.2.

It has been found that the polyesteramide resins according to the invention exhibit surprisingly good compatibility with EVA copolymers, particularly if the co-dicarboxylic acid content of the polyesteramide is as low as possible, preferably below 0.3 eqivalent calculated on the total number of acid equivalents. The amount of EVA copolymer in the mixture can be raised to 50 percent or more, depending on the type of polyesteramide and type of EVA copolymer which are involved. In general, the vinyl acetate content in an EVA copolymer is most important to the question of its compatibility; other physical properties play a minor role, if any.

Mixing itself is preferably carried out in special apparatus such as kneaders or extruders. Nevertheless using the polyesteramides according to the present invention, the mixing can also take place by intensive stirring of the liquefied components.

The mixtures prepared from the polyamide resins of the invention and EVA copolymers show no demixing phenomenon, either when warm or when cold. Even using the above-described "break-test", no incompatibility can be observed. (cf. Table 2 below).

Further, the polyesteramides according to the present invention distinguish themselves from known systems by a better flexibility, also at low temperatures, and further show an outstanding resistance to impact stress, as well as good adhesion values on the most diverse substrates. These good properties are retained even at relatively low melt viscosities.

As is evident from Table 3 below, the polyamide resins according to the invention show very high extension values at $-20°$ C. In the previously known polyamide resins comprising dimeric fatty acids, extension values of at most 200 percent at $-20°$ C. can be reached only if expensive co-diamines such as dipiperidyl propane are used. The ordinary polyamide resins, in contrast, show considerably lower values at minus temperatures.

In addition to polyethylene, lead, and aluminum, the following substrates can be adhered to themselves or to one another with the materials of the present invention: leather, rubber, textiles, wood, paper, polyvinyl chloride, polyolefins, polyesters, ceramics, glass, and the ferrous and non-ferrous metals common in technology such as steel, copper, zinc, tin, or their alloys.

For adhering polyesters, which are particularly difficult to adhere, the diglycolamine content of the polyesteramides of the invention is preferably raised to about 0.5 equivalent or higher.

The dicarboxylic acids which may optionally be employed according to the present invention have the formula $$R^2OOC-R^1-COOR^2,$$

wherein $R^1$ is an optionally substituted aliphatic, cycloaliphatic, aromatic, or araliphatic hydrocarbon having 4-12 carbon atoms, and $R^2$ is hydrogen or alkyl having 1-8 carbon atoms.

These co-dicarboxylic acids can be used in amounts of up to 0.9 equivalent per unit equivalent of total acid component employed.

As examples of these acids are mentioned: adipic acid, pimelic acid, suberic acid, azelaic acid, sebacic acid, decanedicarboxylic acid, brassylic acid, 1,4-cyclohexandicarboxylic acid, terephthalic acid, isophthalic acid, naphthalene dicarboxylic acid, and 1,4-phenylene diacetic acid. Azelaic, sebacic, and terephthalic acids are preferred according to the invention.

The sum of the molar equivalents of the amine groups and hydroxyl groups present in components (B), (C), and (D) which are used is preferably essentially equal to the molar equivalents of the carboxyl groups of components (A) and (E).

The condensation of the aforementioned components to form the polyesteramides according to the invention takes place at temperatures between 200° C. and 300° C. in conventional fashion.

A better understanding of the present invention and of its many advantages will be had by referring to the following specific Examples, given by way of illustration. The dimerized fatty acids used in the following Examples have the following composition (according to gas-liquid-chromatography).

| Examples | Polymerized Tall Oil Fatty Acid | |
|---|---|---|
| 1-3, 5-9 | Monomeric fatty acid | 0.5% |
| | Dimeric fatty acid | 96.5% |
| | Trimeric and higher polymeric fatty acids | 3.0% |
| Example | Polymerized Oleic Acid | |
| 4 | Monomeric fatty acid | 5.6% |
| | Dimeric fatty acid | 79.1% |
| | Trimeric and higher polymeric fatty acids | 15.3% |

As the EVA component, "ELVAX 260" (commercially available from Du Pont) having a vinyl acetate content of about 28%, "ELVAX 420" having a vinyl acetate content of about 18%, and "ELVAX 40", having a vinyl acetate content of about 40%, were used.

PREPARATION OF THE POLYESTERAMIDES OF THE INVENTION

EXAMPLE 1

A 1 liter 3-necked flask equipped with a thermometer, nitrogen inlet, stirrer, and condenser and receiver was loaded with 400 g of distilled dimeric tall oil fatty acid, 4 g of "Naugard 445" antioxidant, 0.1 g of phosphoric acid (85%), 21.13 g of ethylene diamine (0.5 equivalent), 8.17 g of hexamethylene diamine (0.1 equivalent), and 30.15 g of diglycolamine (0.4 equivalent).

After displacement of the air by nitrogen, the reaction mixture was heated to 250° C. over a period of 90 minutes with stirring under nitrogen and was kept for 6 hours at this temperature. During the last four hours, a vacuum of 15 mbar was applied.

The product obtained had the following properties:

| ring and ball softening point: | 82° C. |
|---|---|
| melt viscosity: | 3.4 Pas at 200° C. |
| amine number: | 1.0 |
| acid number: | 5.1 |

The products reported in Table 1 below were prepared in analogous fashion.

TABLE 1

| Ex | (A) | (E) | Equivalence Ratio (A):(E) | (B) Ethylene diamine | (C) | (D) di-glycol-amine | Equivalence Ratio (B):(C):(D) | Acid No. | Amine No. | R + B (°C.) | Viscosity at 200° C. (Pas) |
|---|---|---|---|---|---|---|---|---|---|---|---|
| 2 | 400.00 g dimerized tall oil fatty acid | — | 1:0 | 21.13 g | 16.33 g 1,6-diaminohexane | 22.69 g | 0.5:0.2:0.3 | 1.4 | 4.9 | 84 | 5.3 |
| 3 | 400.00 g dimerized tall oil fatty acid | — | 1:0 | 21.13 g | 24.49 g 1,6-diaminohexane | 15.12 g | 0.5:0.3:0.2 | 0.9 | 4.7 | 85 | 6.2 |
| 4 | 340.20 g dimerized oleic acid 19.80 g tall oil fatty acid | 18.90 g dimethyl terephthalate | 0.87:0.13 | 21.94 g | 25.45 g 1,6-diaminohexane | 15.71 g | 0.5:0.3:0.2 | 2.1 | 6.3 | 171 | 5.0 |
| 5 | 360.00 g dimerized tall oil fatty acid | 29.95 g azelaic acid | 0.8:0.2 | 23.77 g | 9.18 g 1,6-diaminohexane | 34.03 g | 0.5:0.1:0.4 | 2.1 | 5.5 | 107 | 3.1 |
| 6 | 360.00 g dimerized tall oil fatty acid | 29.95 g azelaic acid | 0.8:0.2 | 23.77 | 31.11 g 1,12-diamino-4,9-dioxa-dodecane | 25.52 g | 0.5:0.2:0.3 | 1.3 | 5.9 | 101 | 2.6 |
| 7 | 400.00 g dimerized tall oil fatty acid | — | 1:0 | 33.80 g | 46.35 g dimeric fatty acid diamine | 7.56 g | 0.8:0.1:0.1 | 1.2 | 5.0 | 109 | 9.2 |
| 8 | 266.00 g dimerized tall oil fatty acid 14.00 g tall oil | 93.18 g azelaic acid | 0.5:0.5 | 29.58 g | 38.71 g 1,12-diamino-4,9-dioxa-dodecane | 31.76 g | 0.5:0.2:0.3 | 1.4 | 7.5 | 156 | 2.8 |

TABLE 1-continued

| Ex | (A) | (E) | Equivalence Ratio (A):(E) | (B) Ethylene diamine | (C) | (D) di-glycol-amine | Equivalence Ratio (B):(C):(D) | Acid No. | Amine No. | R + B (°C.) | Viscosity at 200° C. (Pas) |
|---|---|---|---|---|---|---|---|---|---|---|---|
| 9 | 266.00 g dimerized tall oil fatty acid 14.00 g tall oil fatty acid | 93.18 g azelaic acid | 0.5:0.5 | 29.58 g | 109.77 g dimeric fatty acid diamine | 31.76 g | 0.5:0.2:0.3 | 1.4 | 5.5 | 159 | 1.6 |

R + B = Ring and Ball Softening Point, measured according to DIN 1995

TABLE 2

| Mixture Tested | | Compatibility as Tested by the Break Test |
|---|---|---|
| Product of the Invention (Table 1) (pbw) | EVA (pbw) | |
| 50 Example 1 | 50 "ELVAX 260" | + |
| 50 Example 3 | 50 "ELVAX 260" | + |
| 50 Example 4 | 50 "ELVAX 260" | + |
| 70 Example 5 | 30 "ELVAX 40" | + |
| 70 Example 6 | 30 "ELVAX 40" | + |
| 50 Example 7 | 50 "ELVAX 40" | + |
| 70 Example 3 | 30 "ELVAX 420" | + |
| 70 Example 4 | 30 "ELVAX 420" | + |

| Mixture Tested | | Compatibility as Tested by the Break Test |
|---|---|---|
| Commercially Available Prior Art Polyamide Resins (pbw)* | EVA (pbw) | |
| 50 A | 50 "ELVAX 260" | — |
| 50 B | 50 "ELVAX 260" | — |
| 50 C | 50 "ELVAX 260" | — |
| 70 A | 30 "ELVAX 420" | — |
| 70 B | 30 "ELVAX 420" | — |
| 70 C | 30 "ELVAX 420" | — |

+ = compatible
− = incompatible
*see Supplement to Table 2 infra.

Supplement to Table 2
Composition of Prior Art Polyamide Resins

| Resin | Dimerized Fatty Acid Content (Equivalents) | Co-Dicarboxylic Acid Content (Equivalents) | Diamine Content (Equivalents) | Ring and Ball Softening Point (°C.) |
|---|---|---|---|---|
| A | 1.0 | — | 1.0 Ethylene diamine | 105–115 |
| B | 0.945 | 0.055 Adipic acid | 1.0 Ethylene diamine | 123–133 |
| C | 0.65 | 0.35 Azelaic acid | 0.4/0.6 Ethylene diamine/ Piperazine | 140–145 |
| D | 0.67 | 0.33 Sebacic acid | 0.5/0.5 Ethylene diamine/ 2,3-di(4-piperidyl)-propane | 135–145 |
| E | 0.865 | 0.135 Adipic acid | 0.970 Ethylene diamine | 170–180 |

TABLE 3

| Polyamide Resin | Melt Viscosity at 200° C. (Pas) | Extension at −20° C. (%)+ |
|---|---|---|
| Commercially Available Prior Art Polyamide Resins* | | |
| A | 0.5 | 0 |
| E | 5.0 | 0 |
| C | 6.0 | 130 (1.3 m/m) |
| D | 15 | 200 (2.0 m/m) |
| Products of the Invention (Table 1) | | |
| Example 1 | 3.4 | 550 (5.5 m/m) |
| Example 2 | 5.3 | 430 (4.3 m/m) |
| Example 3 | 6.2 | 280 (2.8 m/m) |
| Example 8 | 2.8 | 330 (3.3 m/m) |
| Example 9 | 1.6 | 300 (3.0 m/m) |

+measured according to ASTM D1708
*see Supplement to Table 2 supra.

What is claimed is:
1. A polyesteramide prepared by the condensation of (A) a dimerized fatty acid having 16 to 44 carbon atoms, with

(B) ethylene diamine, with
(C) at least one diamine of the formula $$H_2N-R-NH_2,$$

wherein R is aliphatic hydrocarbon having 3 to 36 carbon atoms which can be interrupted by one or more hetero atoms, and with
(D) diglycolamine.

2. A polyesteramide as in claim 1 which additionally comprises condensed therein
(E) a dicarboxylic acid of the formula $$R^2OOC-R^1-COOR^2,$$

wherein $R^1$ is aliphatic, cycloaliphatic, aromatic, or araliphatic hydrocarbon having 4 to 12 carbon atoms and $R^2$ is hydrogen or alkyl having 1 to 8 carbon atoms.

3. A polyesteramide prepared by the condensation of substantially equivalent amounts of (1) an acid component comprising
(A) a dimerized fatty acid having 16 to 44 carbon atoms, and
(E) a dicarboxylic acid of the formula $$R^2OOC-R^1-COOR^2,$$

wherein $R^1$ is aliphatic, cycloaliphatic, aromatic, or araliphatic hydrocarbon having 1 to 8 carbon atoms,
wherein the equivalence ratio of component (A) to component (E) is between 1:0.0 to 0.1:0.9, with (2) an amine and hydroxy component comprising
(B) ethylene diamine,
(C) at least one diamine of the formula $$H_2N-R-NH_2,$$

wherein R is aliphatic hydrocarbon having 3 to 36 carbon atoms which can be interrupted by one or more hetero atoms, and
(D) diglycolamine
wherein the equivalence ratio of components (B) and (C) to component (D) is between 0.3:0.7 and 0.9:0.1.

4. A polyesteramide as in claim 3 wherein the equivalence ratio of component (B) to component (C) is between 0.05:0.25 and 0.25:0.25 at the limiting diglycolamine (D) content of 0.7 equivalent, is between 0.1:0.8 and 0.8:0.1 at the limiting diglycolamine (D) content of 0.1 equivalent, and has intermediate values at diglycolamine contents between said limiting contents.

5. A mixture of a polyesteramide as in claim 3 with a copolymer of ethylene and vinyl acetate.

6. A mixture as in claim 5 comprising 50 percent or more of said copolymer.

* * * * *